United States Patent
Kristensen

(10) Patent No.: US 9,567,980 B2
(45) Date of Patent: Feb. 14, 2017

(54) ARRANGEMENT TO REDUCE NOISE ORIGINATED BY A WIND TURBINE BLADE

(71) Applicant: Jens Jørgen Østergaard Kristensen, Nibe (DK)

(72) Inventor: Jens Jørgen Østergaard Kristensen, Nibe (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 707 days.

(21) Appl. No.: 13/761,246

(22) Filed: Feb. 7, 2013

(65) Prior Publication Data

US 2013/0223988 A1    Aug. 29, 2013

(30) Foreign Application Priority Data

Feb. 24, 2012  (EP) .................................... 12156864

(51) Int. Cl.
*F03D 11/00* (2006.01)
*F03D 1/06* (2006.01)

(52) U.S. Cl.
CPC ............ *F03D 11/00* (2013.01); *F03D 1/0641* (2013.01); *F05B 2260/96* (2013.01); *Y02E 10/721* (2013.01)

(58) Field of Classification Search
CPC ...... F03D 1/0641; F03D 11/00; F03D 1/0675; F03D 1/0633; F03D 1/0683; F05B 2260/96; Y02E 10/721; F05D 2240/302; F05D 2240/304; F05D 2260/96
See application file for complete search history.

(56) References Cited

U.S. PATENT DOCUMENTS

| | | | | |
|---|---|---|---|---|
| 5,088,665 A | * | 2/1992 | Vijgen | B64C 23/06 244/198 |
| 7,798,780 B2 | * | 9/2010 | Bakhuis | F03D 1/0675 416/223 R |
| 7,854,594 B2 | * | 12/2010 | Judge | B29C 66/124 416/226 |
| 7,976,276 B2 | * | 7/2011 | Riddell | F03D 1/0633 416/223 R |
| 8,020,504 B2 | * | 9/2011 | Shkolnikov | B23K 31/02 114/67 R |
| 8,317,479 B2 | * | 11/2012 | Vronsky | F03D 1/0641 416/196 A |

(Continued)

FOREIGN PATENT DOCUMENTS

| | | |
|---|---|---|
| DE | 2742645 A1 | 4/1979 |
| EP | 1314885 B1 | 8/2007 |

(Continued)

*Primary Examiner* — Igor Kershteyn
*Assistant Examiner* — Eldon Brockman

(57) ABSTRACT

An arrangement for reducing noise which is generated by a wind turbine blade is provided. The wind turbine blade has a first panel and a second panel. The first and the second panel are arranged at a trailing edge of the wind turbine blade, wherein the first panel is adjacent to the second panel. The first panel includes a first transition zone and the second panel includes a second transition zone. The first transition zone and the second transition zone are engaged in a way that whistle tones produced by a gap of the wind turbine blade, the gap being located between the first panel and the second panel, is reduced or even avoided.

7 Claims, 2 Drawing Sheets

(56) References Cited

U.S. PATENT DOCUMENTS

| | | | |
|---|---|---|---|
| 8,430,046 B1* | 4/2013 | Shkolnikov | B29C 70/00 114/357 |
| 8,899,923 B2* | 12/2014 | Hancock | F03D 1/0641 416/23 |
| 2007/0036659 A1* | 2/2007 | Hibbard | B29C 63/22 416/233 |
| 2007/0140858 A1* | 6/2007 | Bakhuis | F03D 1/0675 416/223 R |
| 2009/0028705 A1 | 1/2009 | Meldgaard | |
| 2009/0074585 A1* | 3/2009 | Koegler | F03D 1/0675 416/228 |
| 2010/0143143 A1* | 6/2010 | Judge | B29C 66/124 416/226 |
| 2011/0142637 A1* | 6/2011 | Riddell | F03D 1/0633 416/62 |
| 2011/0293420 A1* | 12/2011 | Hancock | F03D 1/0641 416/23 |
| 2012/0027590 A1 | 2/2012 | Bonnet | |

FOREIGN PATENT DOCUMENTS

| | | |
|---|---|---|
| JP | 2000120524 A | 4/2000 |
| WO | WO 0146582 A2 | 6/2001 |

* cited by examiner

US 9,567,980 B2

ARRANGEMENT TO REDUCE NOISE ORIGINATED BY A WIND TURBINE BLADE

CROSS REFERENCE TO RELATED APPLICATIONS

This application claims priority of European Patent Application No. 12156864.6 EP filed Feb. 24, 2012. All of the applications are incorporated by reference herein in their entirety.

FIELD OF INVENTION

An arrangement to reduce aerodynamic noise, which is originated by a wind turbine blade, is provided.

BACKGROUND OF INVENTION

EP 1 314 885 discloses a flexible serrated trailing edge of a wind turbine. A serrated panel is connected at the trailing edge of the blade to optimize the aerodynamic characteristics of the wind turbine blade. This results in an increased electrical output power of the wind turbine for example.

The shape of the trailing edge even influences the noise or the aerodynamic noise, which is originated by the wind turbine blade. Thus, the dimension and the shape of a panel, which is attached to the trailing edge, even contribute to the aerodynamic noise of the turning wind turbine blade. Thus a compromise needs to be found between the location and the dimension of the panel for an improved blade-characteristic on the one hand and a reduced aerodynamic noise on the other hand.

FIG. 4 shows a blade 1 of a wind turbine. A number of panels 2 are arranged at and along the trailing edge TE of the blade 1. The panels 2 show a number of serrations SE. the size and the shape of the panels are optimized in a way that a lift-drag-ratio of the blade is increased. Thus, the aerodynamic characteristics of the blade 1 are improved.

The panels 2 might connected by a glue with the trailing edge TE. Thus retrofitting of existing blades in dependency of specific conditions of the site of the wind turbine is quite easy.

The panels 2 may be made in smaller sections and may be attached side by side as illustrated. Thus an entire flap, arranged at the trailing edge TE of the blade, is established or constituted.

FIG. 5 shows a specific detail of FIG. 4, which is indicated by a circle there. The flap FP as shown here in detail comprises several panels 2. This allows a flexible movement of the serrated panels 2 when the wind turbine is in operational mode. Due to the flexing of the serrated panels the blade characteristics are improved.

There is a little gap GP between two adjacent panels 2. The gap GP is needed for the flexing movement of the panels 2. Additionally, the panels 2 are connected with the trailing edge TE by a band or strip or connection-area FX. This connection-area FX is preferably used for a glue-connection.

Another band or strip OL is arranged between the connection area FX and the serrations SE, thus a kind of "overhang" or projection OL is created.

The little gap GP between the panels 2 generates a whistle-tone as aerodynamic noise. The whistle-tone is even influenced by the dimension of the strip OL or overhang OL.

The whistle tone is originated by the wind V, which is slipping through the gap GP. This is schematically shown in FIG. 6.

FIG. 7 refers to the FIG. 5 and shows a well known prior art solution to reduce this whistle-tone.

The gap GP between the panels 2 is filled with a flexible filler material 3. However, the filler material 3 deteriorates over time and becomes stiff and inflexible. Thus the filler material 3 finally might fall off. The usage of the filler material even results in time extensive work thus this solution is expensive.

SUMMARY OF INVENTION

It is an object to provide an improved arrangement to reduce or even avoid noise, which is originated by a wind turbine blade. The object is achieved by an arrangement as claimed in the claims.

An arrangement is provided to reduce aerodynamic noise, which is originated by a wind turbine blade. The blade comprises a first panel and a second panel. The first and the second panel are arranged at the trailing edge of the blade, while the first panel is adjacent to the second panel. The first panel comprises a first transition zone and the second panel comprises a second transition zone. The first transition zone and the second transition zone are engaged in a way that the origination of whistle tones by a gap, which is between the first panel and the adjacent second panel, is reduced or even avoided.

In a configuration, the first and/or the second transition zone comprises a lip. The lip is used for an engaged connection of the transition zones. Thus the gap is narrowed and reduced in a way that the slipping of wind through the gap is hindered or avoided.

For example, the first and the second transition zone comprise a lip each. The lips are overlapped and are preferably engaged in a form-fitted manner. Thus the gap is narrowed or even closed or reduced in a way that the slipping of wind through the gap is hindered or avoided.

In a configuration, the first transition zone is engaged with the second transition zone by a groove-and-tongue connection. Thus the gap is narrowed or even closed or reduced in a way that the slipping of wind through the gap is hindered or avoided.

In another embodiment, the panels are arranged and shaped in a way that the aerodynamic characteristic of the blade is improved.

In another embodiment, the panels are arranged and prepared for a flexing movement of the panels. Thus the aerodynamic characteristic of the blade is improved.

In another embodiment, the engaged transition zones are prepared to support the flexing movement of the panels. Thus the aerodynamic characteristic of the blade is improved, too.

In another embodiment, the panels comprise a number of serrations (SE), which are arranged and shaped in a way that the aerodynamic characteristic of the blade is improved.

In another embodiment, the panels are connected with the trailing edge by a glued connection. Thus retrofitting of existing blades with panels is enabled.

The provided arrangement allows a trade-off between optimized aerodynamic characteristics of the blade on the one hand and an optimized noise-reduction on the other hand. The arrangement results in a long-term and quite stable arrangement avoiding unreliable and weak parts, which were used before—like filler material for example. Further, the arrangement allows the reduction of working time and thus the reduction of costs.

The arrangement even allows the compensation of tolerances, which might be introduced by two spaced adjacent panels. Variances or tolerances are met and compensated by the specific overlapping portion as claimed.

The arrangement may be used for each shaped panel. It does not matter if the panel is serrated or not. Thus a wide range of panels can be used optimize the blade.

Even an optimized retrofitting of existing blades by panels is supported by the arrangement.

DETAILED DESCRIPTION OF INVENTION

Figure 1:
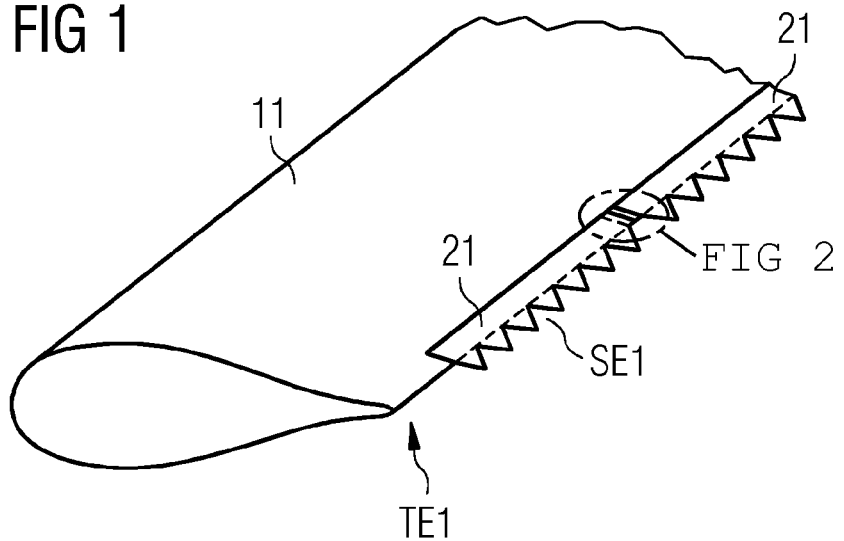
FIG. 1 shows a blade with panels as starting point for the arrangement.

FIG. 1 shows a blade 11 with panels 21. A plurality of panels 21 are arranged at and along the trailing edge TE1 of the blade 11. The panels 21 show a number of serrations SE1.

The size and the shape of the panels 21 are optimized in a way that a lift-drag-ratio of the blade 11 is increased. Thus the aerodynamic characteristics of the blade 11 are improved.

The panels 21 might be connected by glue with the trailing edge TE1. Thus retrofitting of existing blades 11 in dependency of specific conditions of the site of the wind turbine is quite easy.

The panels 21 may be made in smaller sections and may be attached side by side as illustrated. Thus an entire flap, arranged at the trailing edge TE1 of the blade 11, is established or constituted.

Figure 2:
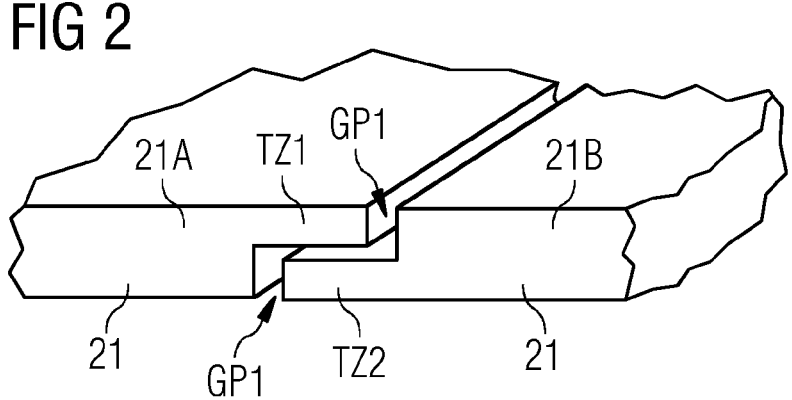
FIG. 2 shows the engagement of the panels according to an embodiment.

FIG. 2 shows the engagement of the panels 21 according to an embodiment. Reference is made to FIG. 1 and to the circle shown there. The panels 21 are arranged in adjacent manner as shown in FIG. 1.

A first panel 21A comprises a first transition zone TZ1. A second panel 21B comprises a second transition zone TZ2. The first transition zone TZ1 and the second transition zone TZ2 each comprises a lip. The lips overlap each other, thus, the lips are engaged when the panels 21 are positioned at the trailing edge TE1 of the blade 11.

The gap GP1, which is arranged between the panels 21A and 21B, is reduced in its dimension; thus, the origination of whistle tones by the gap GP1 is reduced or even avoided.

The overlap allows the flexible movement of the panels 21 in relation to each other. Thus the flexibility of the construction is maintained.

Figure 3:
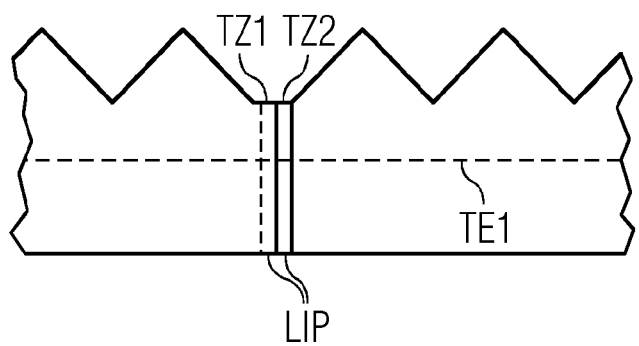
FIG. 3 shows a detail of the connection, which is shown in FIG. 2.
Figure 4:
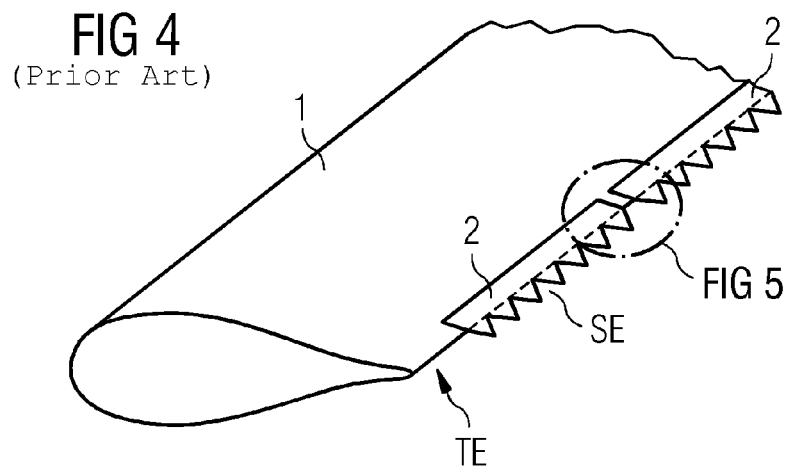
FIG. 4 to FIG. 7 show a known blade of a wind turbine as described previously.
Figure 5:
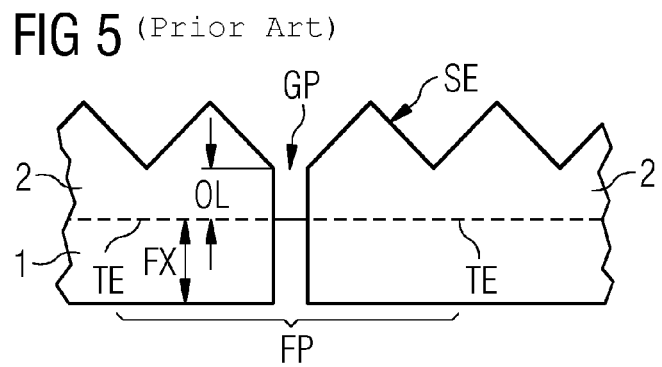
Figure 6:
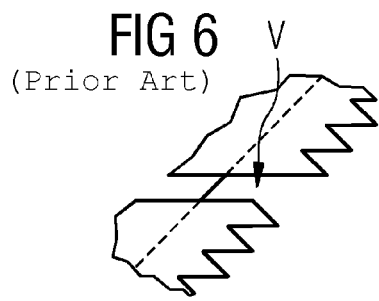
Figure 7:
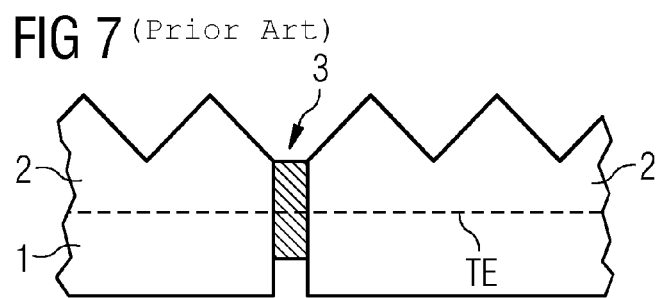

FIG. 3 shows the engaged lips LIP and the engaged transition zones TZ1, TZ2 with reference to FIG. 2 and FIG. 1.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. An arrangement to reduce noise, which is originated by a wind turbine blade,
   wherein the wind turbine blade comprises a first panel and a second panel,
   wherein the first panel and the second panel are arranged at a trailing edge of the wind turbine blade,
   wherein the first panel is adjacent to the second panel,
   wherein the first panel comprises a first transition zone,
   wherein the second panel comprises a second transition zone,
   wherein the first transition zone comprises only a first lip extending from a first panel main body and the second transition zone comprises only a second lip extending from a second panel main body; wherein only the first lip and the second lip overlap and are configured to allow flexible movement between the first panel and the second panel,
   wherein the first transition zone and the second transition zone are engaged such that whistle tones produced by a gap, which is located between the first panel and the second panel, are reduced or eliminated.

2. The arrangement according to claim 1, wherein the first lip and the second lip are shiplapped.

3. The arrangement according to claim 1, wherein the first and second panels are arranged and prepared for a flexible movement of the panels.

4. The Arrangement according to claim 3, wherein engaged first and second transition zones are prepared to support the flexible movement of the panels.

5. The arrangement according to claim 3, wherein the first and second panels are arranged and shaped such that aerodynamic characteristics of the blade are improved.

6. The arrangement according to claim 1, wherein the first and second panels each comprise a plurality of serrations which are arranged and shaped such that aerodynamic characteristics of the wind turbine blade are improved.

7. The arrangement according to claim 1, wherein the first and second panels are connected to the trailing edge via a glued connection.

* * * * *